United States Patent [19]

Cutler

[11] 3,854,353

[45] Dec. 17, 1974

[54] METHOD AND APPARATUS FOR PERFORMING A THREADING OPERATION ON A ROTATING WORKPIECE

[75] Inventor: Hymie Cutler, Detroit, Mich.

[73] Assignee: The Bendix Corporation, Southfield, Mich.

[22] Filed: June 20, 1973

[21] Appl. No.: 371,813

[52] U.S. Cl. .......................... 82/1 C, 82/2 B, 82/5, 235/151.11, 318/567, 318/579, 340/172.5
[51] Int. Cl. ........................... B23b 1/00, B23b 5/46
[58] Field of Search ........................ 82/5, 2 B, 1 C; 235/151.11; 340/172.5; 318/567, 579

[56] References Cited
UNITED STATES PATENTS

| | | |
|---|---|---|
| 3,595,106 | 7/1971 | Pomella et al. .................... 82/5 X |
| 3,381,557 | 5/1968 | Dunn ........................................ 82/5 |
| 3,174,367 | 3/1965 | Lukens .................................... 82/5 |

Primary Examiner—Leonidas Vlachos
Attorney, Agent, or Firm—Lester L. Hallacher

[57] ABSTRACT

A method and apparatus for guiding a tool through the series of paths required to produce a thread cut. Data defining the basic parameters of the thread, the finish cut depth and the initial cut depth are read from an active program storage medium, such as a tape reader, along with a preparatory code which specifies a thread cutting operation. The code then calls up a thread cutting routine from a mass memory which is executed in accordance with the data read from tape. After the tool reaches the final dimension coordinates, control over tool displacement is returned to the tape and tape reader.

12 Claims, 7 Drawing Figures

DIRECTION OF READ →

METHOD AND APPARATUS FOR PERFORMING A THREADING OPERATION ON A ROTATING WORKPIECE

INTRODUCTION

This invention relates to numerically controlled (N/C) machine tools and the like and particularly to a method and apparatus for performing a cutting operation, such as thread forming, in a cyclical sequence of tool displacement operations and using a minimum quantity of data from an active storage medium, such as a punched tape.

BACKGROUND OF THE INVENTION

Many machining operations performed by way of numerically controlled machine tools involve portions which are highly complex and nonrepetitious as well as other portions which, by their very nature, require a simple but repetitious series of machine tool movements for proper execution. It is well known that most numerical control systems involve the reading of data defining tool displacements and other machine functions from an active storage medium, such as a punched paper or plastic tape. The typical N/C system includes an eight-channel, electro-optical tape reader for converting the eight-digit characters assembled in blocks on a punched tape into machine readable form; i.e., into parallel combinations of electrical signals in binary code. To prepare the tape, a programmer having both numerical control and computer programming skills prepares a serial record of tool displacements and machine functions necessary to produce the tool displacement paths which are required to transform a raw workpiece into a finished part.

The part program, i.e., the finished program tape, is often of considerable length and involves the definition of a large number of tool displacement paths, thus, requiring a substantial amount of time and effort in preparation. Moreover, the preparation of a control tape of extraordinary length aggrevates the significance of programming errors in the punched tape since the difficulties and expense in preparing a new tape are proportionately greater for tapes of great length.

Accordingly, it is highly desirable to eliminate from the active record those tool displacement definitions which are associated with a cyclical or repetitious series of tool displacements. An example is the formation of threads on the surface of a rotating workpiece. The typical threading operation calls for a rough cut followed by a series of deeper and deeper cuts until finally the desired thread depth and finish are achieved. Where a large number of such cuts are required, the overall part program tape of which the thread cutting operation may be only a small portion is likely to be greatly increased in length.

The prior art discloses one attempt to mitigate the problem of tape length by providing hardware which is capable of directing a machine tool through an incrementally related series of steps to effect a threading operation. However, the installation and setup operations involved with the use of such hardware are typically incompatible with normal N/C operations and require a substantial break or gap in the flow of operations both at the beginning and end of the thread cutting operation. Moreover, such hardware is relatively inflexible in its application, thus, making it difficult, if not impossible, to adapt to a variety of thread cutting techniques, such as straight threads, tapered threads, etc.

BRIEF STATEMENT OF THE INVENTION

In accordance with the present invention, the control and execution of an N/C operation of the cyclical repetitious type is carried out by reading from an active storage medium a minimum quantity of data defining the limits of tool displacement associated with a cutting operation, reading from the active medium a "preparatory code" which signals the initiation of the cyclical repetitious series of steps which are to be carried out within the limits of tool displacement in order to effect a final desired result, such as a thread formation, and thereafter executing the cyclical program under the control of parameters which are stored in a mass memory operatively associated with the N/C system.

The apparatus preferably employed in carrying out the method of the subject invention includes an N/C system incorporating an active program record, such as a punched tape, an instrumentality for reading the active record, and means responsive to the blocks of data on the active record for executing tool displacements and other machine functions on a demand basis; i.e., a block at a time and at a rate which is set by the ability of the N/C system to execute the series of program blocks. In addition, the N/C system includes a "mass memory" which, in accordance with the invention, is a secondary storage facility, such as the random access memory of a computer system, within which various machine instructions and tool displacement path data relating to a cyclical operation are stored. In addition, the N/C system preferably incorporates an arithmetic unit of digital or analog type capable of performing simple mathematical calculations, such as addition, subtraction, multiplication, and division. By this combination of apparatus, the method may be carried out in such a way as to read conventional tool displacement path definitions and machine function definitions from the active medium, i.e., from the tape, and, when a preparatory code signalling the initiation of the cyclical program is read, the apparatus stores in the mass memory the adjacent data from tape representing the limits of tool path displacement during the cyclical operation, and calls from the mass memory those cyclical operations, including the mathematical calculations, necessary to perform the cyclical and repetitious series of operations without further reference to the active record. Once the cyclical series of operations is completed, control may be turned back to the active tape reader whereby the more complex machine tool operation may be carried out in the conventional fashion.

In brief, the subject invention operates to conserve space on tape by storing in a secondary mass memory the fundamental instructions necessary to carry out a cyclical repetitious series of movements whenever such cyclical series of repetitious movements is called for. The preparatory code calling for the cyclical program, and the data defining the limits of tool displacement during the cyclical program come from the active medium; i.e., the tape.

The invention is hereinafter described with reference to a process for cutting threads in a rotating workpiece, the cyclical series of repetitious movements involving thread cutting movements along the workpiece at increasingly greater depths, retractions of the tool from the workpiece, returns of the tool toward a starting position and the engagement of the tool with the workpiece at the increased depths set by the secondary storage facility instructions. The thread cutting operation of the specific embodiment contemplates the preparation of an active storage medium, such as a punched tape, having three blocks of data which are read from the tape at the initiation of the thread cutting operation. Each of the three blocks contains a preparatory code which indicates the initiation of a thread cutting operation and, in addition to the preparatory code, each block contains data defining certain predetermined limits of the tool displacement during the thread cutting operation. As hereinafter described in detail, these limits include the limits of the tool displacement paths within at least a two-axis coordinate system, the depth of the first or rough cut and the depth of the final or finish cut.

DETAILED DESCRIPTION OF THE SPECIFIC EMBODIMENT

FIG. 1

Figure 1:
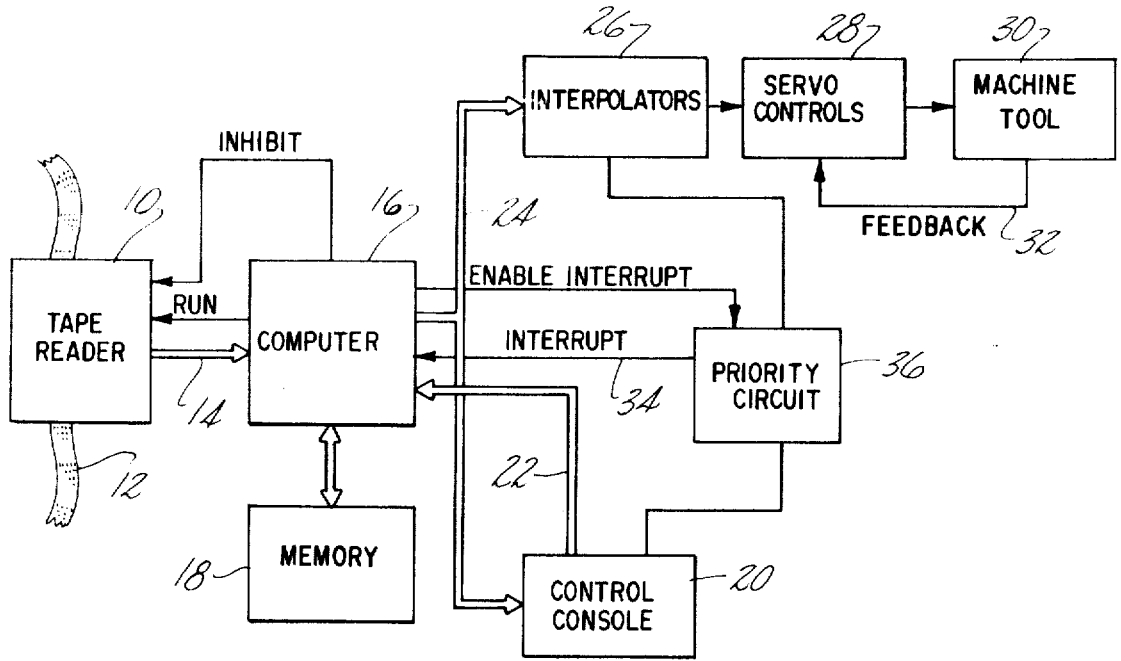
FIG. 1 is a block diagram of an N/C system incorporating both active and mass storage media for primary and secondary control over an N/C operation and incorporating a small, programmable computer for performing simple, mathematical calculations.

The block diagram of FIG. 1 discloses an N/C system in which primary control over the displacements of machine tool 30 and over the conventional machine functions associated therewith is exercised by way of an active storage medium in the form of a punched Mylar tape 12. In addition, a secondary control is exercised, upon call from the active storage medium, by way of a program stored in mass memory 18. The N/C system comprises an eight-channel tape reader 10 for converting the characters on tape 12 into electrical signals in a conventional manner, except when inhibited by a signal from computer 16. Tape reader 10 is connected by way of output channel 14 to a general-purpose programmable computer 16 having a random access mass memory 18 in which certain instructions may be stored in an organized form and retrieved when called by a signal read from tape 12. The N/C system, including the computer 16, is operated under the control of a console having various input devices, such as switches, pushbuttons, and the like, connected to the computer 16 by means of input channel 22. Computer 16 is also connected in output relation to the control console for display purposes and to the axis interpolators 26 by way of channel 24. The interpolators, preferably in the form of digital differential analyzers, receive access command data and output position command pulses to the axis servo controls 28 which are connected to the machine tool 30 in the conventional fashion. Position feedback is provided by means of feedback path 32 between the machine tool 30 and the servo controls 28 for the development of an error signal which actually controls tool displacement as is well known by those skilled in the numerical control art.

As shown in FIG. 1, the N/C system includes a priority circuit 36 having an interrupt output signal path 34 connected to the computer 16 to advise the computer of a "data flow" condition; i.e., the need by one or more of the devices controlled by the computer 16 for an additional block of data from tape 12. Accordingly, the computer 16 normally operates in a basic data transfer mode, managing the timing of the transfer of primary N/C data from the active program on tape 12 at a rate which is determined by the ability of the devices receiving such data to execute the various functions commanded thereby. A system of the type shown in FIG. 1 is more fully disclosed in the copending patent applications Ser. Nos. 62,243 and 62,244, filed Aug. 6, 1970, and assigned to The Bendix Corporation. In addition, a system of the type shown in FIG. 1 is commercially available from the Industrial Controls Division of Bendix Corporation and is marketed under the tradename "System 4."

In accordance with the invention, the system of FIG. 1 is operable to perform conventional tool displacement and machine function operations by following the commands read from tape 12 block by block and to perform special operations of a cyclical and repetitious fashion, such as those involved in the cutting of threads in a surface of a rotating workpiece by following the instructions of a program called from memory 18 by a preparatory code read from tape 12. By way of this two-stage operation, the control over the functions of machine tool 30 is transferred from the tape reader 10 to the computer 16 in response to the reading of a minimum quantity of data in addition to the preparatory code. Once the repetitious series of machine functions is completed within limits set by the minimum data read from tape 12, control is then returned to the tape 12 and tape reader 10 for further execution of the non-repetitious N/C program functions.

FIG. 2

Figure 2:
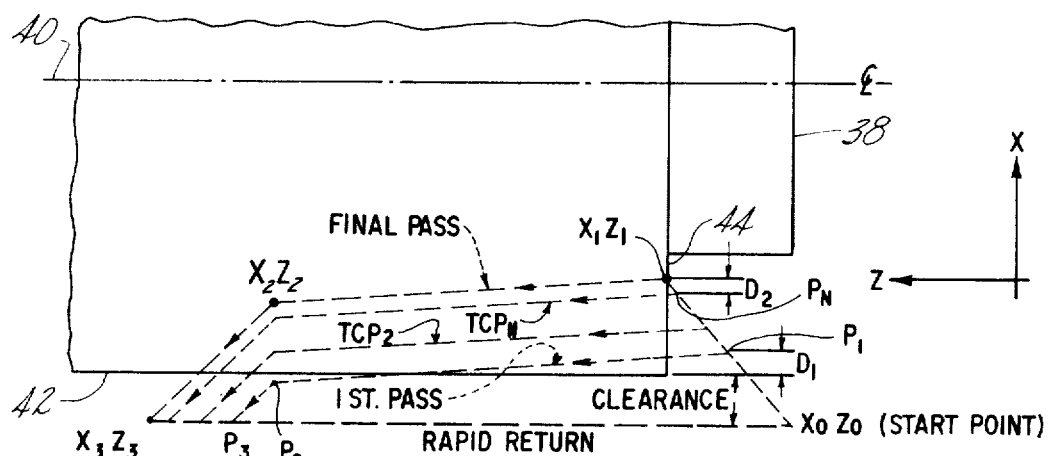
FIG. 2 is a schematic representation of the tool displacements carried out relative to a cylindrical workpiece during a threading operation in accordance with the present invention.

FIG. 2 shows a representative portion of a substantially cylindrical workpiece 38 mounted in a suitable machine tool, such as two-axis lathe, for rotation about the axis of symmetry 40. The machining operation to be performed on workpiece 38 in accordance with the invention involves the cutting of a thread having a gradually increasing diameter in the cyclindrical surface 42 and beginning at a point identified by the coordinate X1, Z1 on the radial shoulder 44. Workpiece 38 is shown in uncut form, the various tool paths defining the threads being represented by broken lines. It will be appreciated that the depths, angles, and other dimensional characteristics of the representation of FIG. 2 are exaggerated for clarity and are not necessarily to be construed as representing a typical machining job. The representation of FIG. 2 is, however, useful in graphically illustrating a specific machining operation which can be carried out in accordance with the invention.

The thread cutting operation results in a thread having a predetermined lead, a thread depth and shape determined by the cutting tool actually used, and a main shank extending from $X_1Z_1$ to $X_2Z_2$ and a conical taper from $X_2Z_2$ and vanishing from the workpiece 38 toward the exterior point $X_3Z_3$ in the coordinate system of FIG. 2. To accomplish this thread production, a cyclical series of repetitious tool displacement paths are carried out including a relative motion between the tool and the workpiece 38 to position the tool to the required depth, in this case, along the X-axis; a threading motion which is typically started by a spindle marker pulse and extending from the shoulder 44 to the left, as seen in FIG. 2; a withdrawal or retraction motion disengaging the tool from the workpiece 38; and a rapid return movement back to a starting point $X_0Z_0$ which is spaced from the workpiece 38 by a radial dimension indicated in FIG. 2 by the word "clearance."

To perform the thread cutting operation represented in FIG. 2, the tool must first be brought to the starting position $X_0Z_0$. This is easily accomplished by programming the displacement of the tool to that point on tape 12 in a conventional fashion. The tool is then brought to a position $P_1$ a depth $D_1$ radially toward the axis 40 of the workpiece 38 and measured from the outer diameter thereof. In this case, the position $P_1$ is not within the physical boundaries of the workpiece, but this is not an absolute requirement. From $P_1$ the tool is caused to displace along a rough-cut pass or "first pass" to an end point $P_2$. The pass from $P_1$ to $P_2$ is, as previously stated, at a depth sufficient to do some rough cutting and is along a line which is parallel to the final thread cut. In this case, the thread cut line is not parallel to the axis 40 since a tapered or conical thread is anticipated. However, nontapering axial threads may also be cut simply by setting $X_2$ equal to $X_1$. The movement of the tool from $P_1$ to $P_2$ is necessarily performed in an IPR (inches per revolution) mode of N/C lathe operation and is initiated by a spindle marker pulse in the conventional fashion.

Next the tool is withdrawn from the workpiece by movement along the conically tapering withdrawal path between points $P_2$ and $P_3$. The Z-axis coordinate of point $P_2$ is the same as the coordinate $Z_2$ which defines the end of the actual threading pass. The X-coordinate of the point $P_3$ is the same as $X_3$, the final point programmed on tape 12 as hereinafter described with reference to FIG. 3.

From $P_3$ the tool is rapidly returned at a high feedrate, e.g., 180 IPM, to the starting point $X_0Z_0$. The loop of tool path movements is repeated under control of the computer 16 through the loops containing thread cut passes $TCP_2$ through $TCP_N$, the depth D into the workpiece 38 being incrementally and linearly increased until the $TCP_N$ pass is reached. All such passes include a thread cut path parallel to the final thread cut pass, a withdrawal to the $X_0$ coordinate, a movement along the rapid return path, and an advance to the new depth.

The thread cut pass $TCP_N$ is at a depth which is radially removed from the final pass by a dimension $D_2$ programmed on tape 12. This permits the final pass to be made at a depth and quality of finish which is selected by the part programmer. The final pass runs from point $X_1Z_1$ to $X_2Z_2$ and, thence, to $X_3Z_3$, all three of these points being programmed on tape 12 and stored in memory 18 for use during the repetitious cyclical sequence of thread cutting loops. When the thread cutting is completed, i.e., the tool finally reaches $X_3Z_3$, the control over the displacements of the machine tool is returned to the tape 12 and tape reader 10 for the further reading of tape and the advancement of the tool to such positions as may be desired.

FIG. 3

Figure 3:
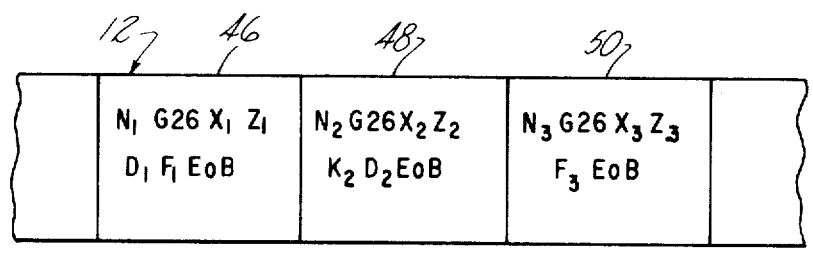
FIG. 3 is a schematicized representation of a section of a tape representing the programming format on the active program medium for calling into play the program from the mass storage medium; and, FIG. 4 (a,b,c and d) is a flow chart of specific instructions for carrying out a thread cutting operation in accordance with the invention.
Figure 4A:
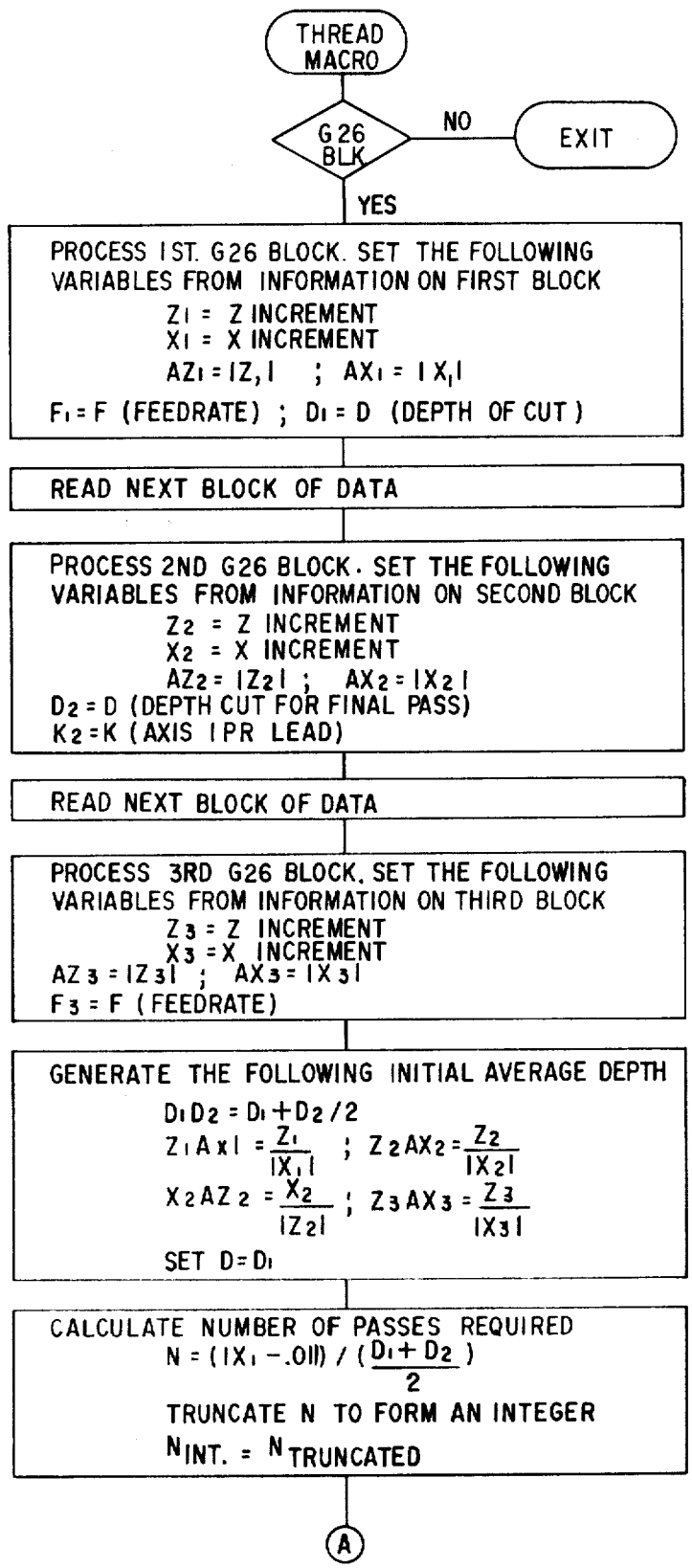
Figure 4B:
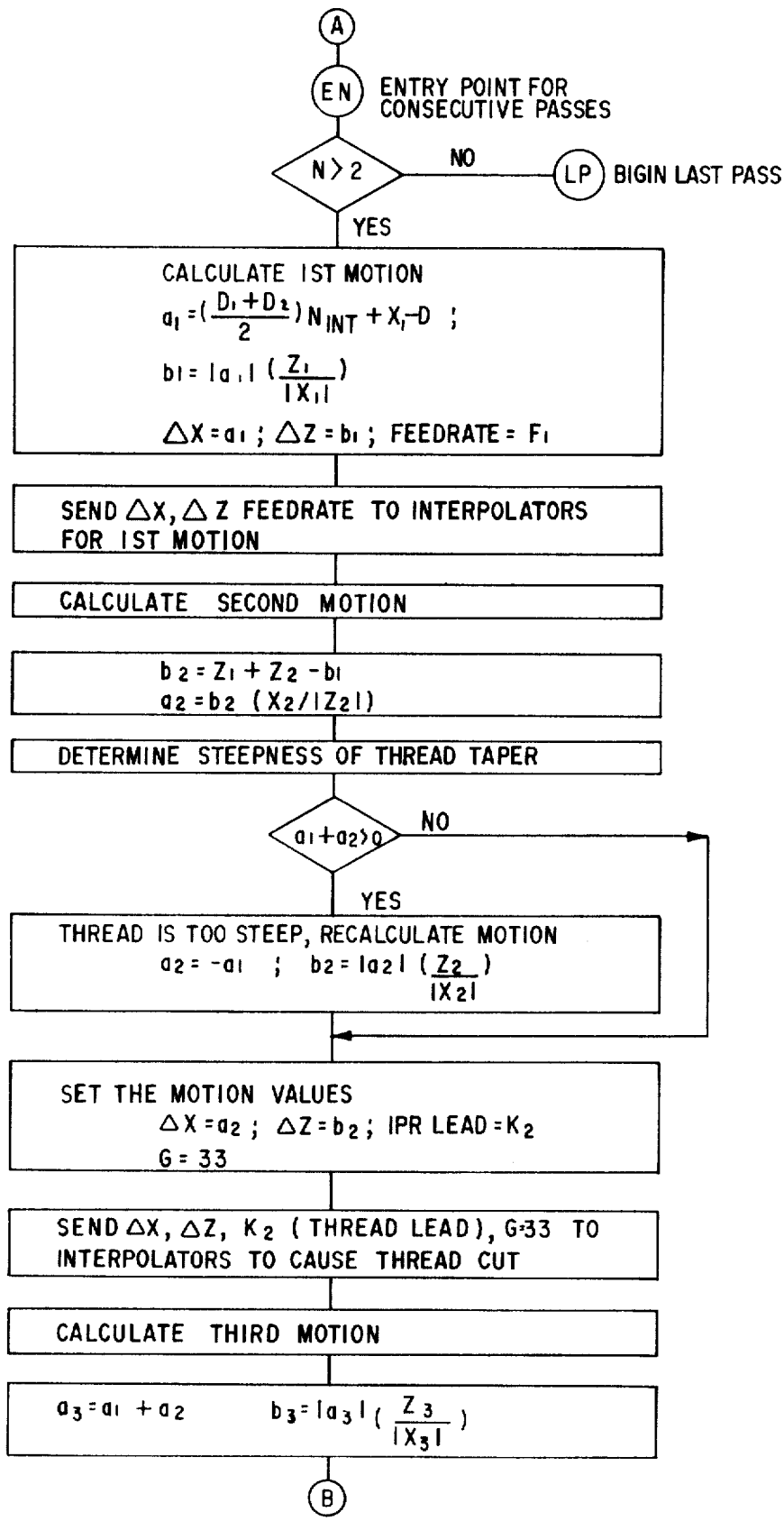
Figure 4C:
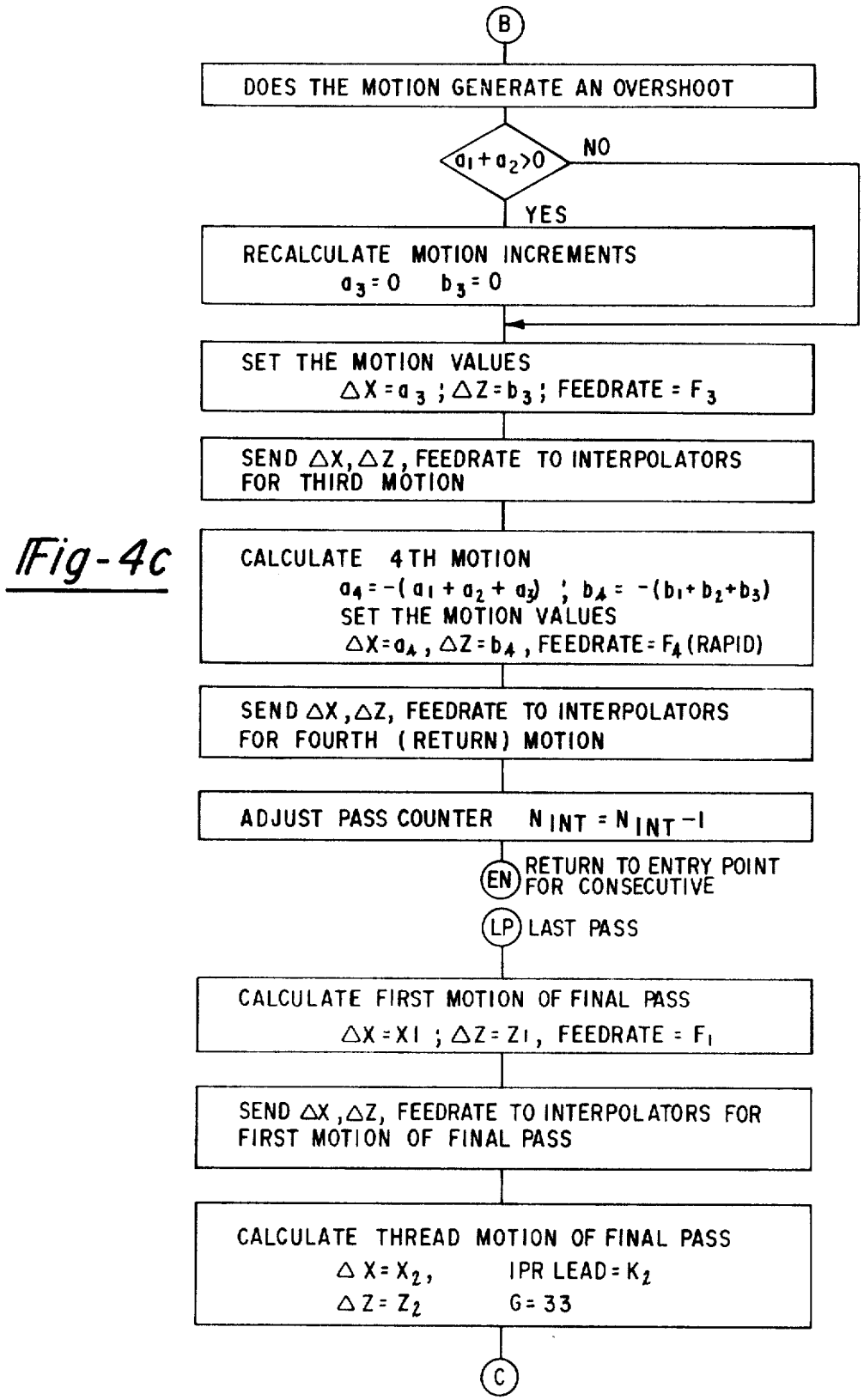
Figure 4D:
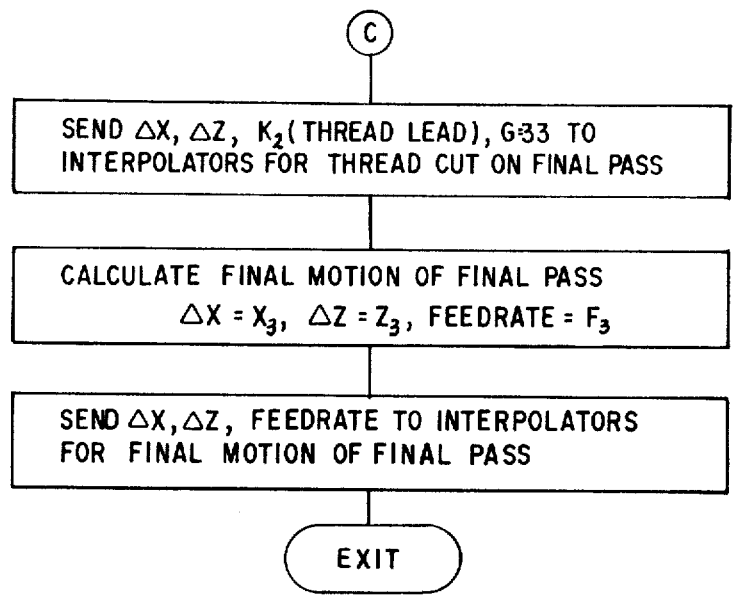

Looking now to FIG. 3, an illustrative format and arrangement of data on tape 12 for the calling up of the thread cutting routine is shown. In the specific example herein described, a thread cutting operation is initiated and carried out using only three blocks 46, 48, and 50 of data on tape 12 regardless of the number of passes, withdrawals, returns, and advances which may be required to actually carry out the thread cutting operation. This is to be contrasted with the length of tape which would be required if each and every linear displacement of the tool were programmed in a separate block on tape 12.

Looking specifically to FIG. 3, it can be seen that block 46 comprises the following eight-bit characters or words each of which is read by the tape reader 10:

$N_1$ is the block or sequence number for block 46;
$G_{26}$ is the preparatory code signalling a thread cutting operation;
$X_1$ is the X coordinate of the final pass point $X_1Z_1$;
$Z_1$ is the Z coordinate of the final pass point $X_1Z_1$;
$D_1$ is the initial or rough cut depth illustrated in FIG. 2;
$F_1$ is the feedrate in effect during the thread cutting operation; and,
EoB is an end-of-block code.

Program block 48 follows a similar format and the eight-bit characters or words in block 48 are as follows:

$N_2$ is the block or sequence number of block 48;
$G_{26}$ is the thread cutting preparatory code;
$X_2$ is the X coordinate of the final pass point $X_2Z_2$;
$Z_2$ is the Z coordinate of the final pass point $X_2Z_2$;
$K_2$ is the thread lead in IPR:
$D_2$ is the final pass depth; and,
EoB is an end-of-block code.

It is to be noted that the format for blocks 46 and 48 should be incremental rather than absolute. Finally, the eight-bit characters or words in block 50 include the following:

$N_3$ is the block or sequence number of block 50;
$G_{26}$ is the thread cutting preparatory code;
$X_3Z_3$ is the final pass exit point;
$F_3$ is feedrate; and,
EoB is an end-of-block code.

It can be seen that the format of data represented by the blocks 46, 48, and 50 permits the active program medium (tape 12) to maintain a continuous control over the displacements of the machine tool relative to the workpiece 38, as well as the other machine functions which are necessary until the first block containing the $G_{26}$ preparatory code is encountered. At this point the tape reader 10 comes under the control of the computer 16 and all three of the tape blocks 46, 48, and 50 are read and the data defining the limits of the thread cutting operation ($X_1Z_1$, $X_2Z_2$, $X_3Z_3$, $D_1$, and $D_2$) are stored in memory 18 to be referred to in determining the progress made during the cyclical sequence of repetitious tool path loops previously described with reference to FIG. 2. Once the final pass, illustrated in FIG. 2 is carried out, and the tool reaches $X_3Z_3$, the computer 16 returns control to the tape reader 10 for further readings of blocks from tape 12 subsequent to block 50. As previously described, these blocks may call for the storing of the tool in a "home" position or, alternatively, the further cutting of metal with or without a tool head change. Operation of the tape reader 10 is inhibited during the execution of the stored program cyclical routine so that no ambiguous data receipt is experienced.

The mathematical calculations involved in the execution of the thread cutting routine and which are carried out in the computer 16 include the following calculations:

A. The number of passes N is calculated according to the formula:

$$N = |X_1 - \text{clearance}| / [2/(D_2 + D_2)] \quad (1)$$

N may be rounded off to be an integer as necessary.

B. The depth of each cut $\Delta D$ is then calculated according to the formula:

$$\Delta D = (D_1 - D_2)/(N - 1) \quad (2)$$

C. The position to require depth is then determined according to the formulas:

$$a_1 = -d + \Delta X_1 + [(D_1 + D_2) N/2]$$
where $d = d - \Delta D$ \quad (3)

$$b_1 = |a_1| \cdot Z_1/|X_1| \quad (4)$$

$$F = F_1 \quad (5)$$

where $a_N$ and $b_N$ are the coordinates of the points $P_1$ through $P_N$ as shown in FIG. 2.

D. The thread cutting motion parallel to the "first pass" and "final pass" is calculated according to the formulas:

$$b_2 = Z_1 + Z_2 - b_1 \quad (6)$$

$$a_2 = b_2 \cdot X_2/|Z_2| \quad (7)$$

$$\text{Lead} = K_2 \quad (8)$$

But if $(a_1 + a_2) > a$, then
$$b_2 = |a_1|Z_2/|X_2| \quad (9)$$

$$a_2 = -a_1 \quad (10)$$

$$\text{Lead} = K_2 \quad (11)$$

E. The withdrawal motion is calculated to the formulas:

$$a_3 = -(a_1 + a_2) \quad (12)$$

$$b_3 = |a_3| \cdot Z_3/|X_3| \quad (13)$$

$$F = F_3 \quad (14)$$

If $(a_1 + a_2) > 0$, then
$$a_3 = 0 \quad (15)$$

$$b_3 = 0 \quad (16)$$

$$F = F_3 \quad (17)$$

F. The positioning of the tool back to the start point is then carried out according to the calculations:

$$a_4 = -(a_1 + a_2 + a_3) \quad (18)$$

$$b_4 = -(b_1 + b_2 + b_3) \quad (19)$$

$$F = 180.00 \text{ IPM (max)} \quad (20)$$

G. The four paths of tool displacement or motion then repeat for N loops until:

$$a_1 = X_1 \quad (21)$$

$$a_2 = X_2 \quad (22)$$

$$a_3 = X_3 \quad (23)$$

$$b_1 = Z_1 \quad (24)$$

$$b_2 = Z_2 \quad (25)$$

$$b_3 = Z_3 \quad (26)$$

When these six equalities occur, the threading cycle is completed and the inhibit tape reader signal may be discontinued whereby additional blocks from tape 12 may be read in the conventional fashion. For a four-axis, two-headed lathe, the second head must remain stationary while the threading cycle is being executed. The inhibit function applied to the tape reader ensures that this is the case.

Although the actual writing of instructions for storage in the memory 18 of computer 16 to enable the carrying out of a threading operation in accordance with the invention is believed to be within the routine skill of an N/C programmer of reasonable competence, the flow chart of FIG. 4 illustrates a specific logic sequence and instruction set for carrying out a thread cutting operation in an N/C system of the type shown in FIG. 1 wherein the computer 16 and memory 18 are of the "mini-computer" type; i.e., the memory is a random access digital memory of at least five-thousand bits capacity and the computer 16 incorporates an arithmetic unit capable of carrying out the mathematical operations implicit in the formulas 1 through 26 set forth herein.

The embodiments of the invention in which an exclusive property or priviledge is claimed are defined as follows:

1. A method of operating an N/C machine tool comprising the steps of: reading blocks of coded data from an active record of tool displacements and machine functions; reading from said record at least one block containing a preparatory code for initiation of a cyclical program including the steps of causing a tool to be displaced into engagement with a rotating workpiece, causing displacement of the tool along the workpiece to machine the workpiece, withdrawing the tool from engagement with the workpiece, and repeating the tool displacement steps of engagement, machining, and withdrawal at cutting depths which increase incrementally within said limits; reading from the blocks containing said preparatory code and storing in a mass memory data defining limits of tool displacement within said cyclical program of tool displacements; and thereafter executing said cyclical program under the control of parameters stored in said memory and without reference to said active record.

2. A method as defined in claim 1 wherein the steps of reading and storing said blocks of coded data includes reading and storing data defining a first depth $D_1$ for determining the depth of the first of said repetitious thread cutting displacements, and a final depth $D_2$ for determining depth of the final thread cutting displacement.

3. A method for machining a thread in a surface of a rotating workpiece using a tool having displacement capability relative to the workpiece along at least two axes and wherein said thread is defined by a tool displacement perimeter path of final thread depth, said method including the steps of: reading the coordinates of said perimeter path and a thread cutting preparatory code from an active storage medium, storing the data defining the perimeter path in a mass memory, and cyclically moving the tool through loops of incrementally increasing thread depth from a rough cut to a final cut within the limits of said perimeter path under the control of a program stored in said mass memory.

4. A method as defined in claim 3 including the further step of inhibiting the reading of the active medium during the performance of said cyclical tool displacements.

5. A method as defined in claim 3 wherein each of said loops include a path of tool advancement toward the workpiece, a thread cutting path, a path of withdrawing the tool from the workpiece, and a tool return path.

6. A method as defined in claim 5 wherein each of the successive thread cutting paths is initiated by a spindle marker pulse.

7. A method as defined in claim 5 wherein each of the thread cutting paths is performed in an IPR mode.

8. A method as defined in claim 5 wherein each of the return paths is traversed at a feedrate which is high as compared to the feedrate at which the tool traverses the workpiece during a thread cutting path.

9. A method as defined in claim 5 including the additional steps of calculating the number $N$ of thread cutting paths required to advance incrementally at a uniform additional depth $\Delta D$ from one thread cutting path to the next to advance from an initial rough cut depth $D_1$ to a final pass of depth $D_2$ along the perimeter path.

10. A method as defined in claim 9 wherein the number of passes $N$ is calculated according to the relationship $N = |X_1 - \text{clearance}|/[2/(d_1 + D_2)]$ wherein $X_1$ is the coordinate along the axis of tool withdrawal and advance of the initial thread cutting path point on the perimeter path and clearance is the initial separation between the tool and the surface to be threaded along the same axis.

11. An apparatus for cutting a thread in a surface of a rotating workpiece comprising: means for rotating the workpiece, means for moving a tool along at least two axes relative to the workpiece, a tape reader for reading a part program tape containing blocks of information defining relative displacements between the tool and the workpiece, the limits of a final thread cutting perimeter path and a preparatory code for thread cutting operations, a programmable computer having a memory and being connected to receive signals from the tape reader, a program stored in the memory of said computer and defining the cyclical sequential operations of engaging the tool with said rotating workpiece, causing displacement of said tool along said workpiece to machine a thread therein, and withdrawing said tool from engagement with said workpiece, said cyclical operations being performed at incrementally increasing thread depths from an initial rough cut to said final thread perimeter path, means in said computer responsive to said preparatory code to call said program from said memory upon reading of same, and means responsive to the tool reaching said final path to exit from said program.

12. Apparatus as defined in claim 11 including a part program tape having at least three program blocks, each of said blocks containing indicia defining a thread cutting preparatory code.

* * * * *